July 5, 1949.  H. E. RIEVES  2,474,959

TIE ROD AND KNUCKLE ARM CLIP

Filed Feb. 17, 1947

Inventor

Howard E. Rieves

By *Clarence A. O'Brien and Harvey B. Jacobson*
Attorneys

Patented July 5, 1949

2,474,959

UNITED STATES PATENT OFFICE 2,474,959

TIE ROD AND KNUCKLE ARM CLIP

Howard E. Rieves, Sumner, Miss., assignor of twenty-five per cent to Jesse J. Breland and twenty-five per cent to John W. Whitten, Jr.

Application February 17, 1947, Serial No. 729,081

3 Claims. (Cl. 287—90)

1

This invention relates to certain new and useful improvements in a retaining and safety assurance clip for a conventional type ball stud such as is used, for example, as a connecting and assembling member between co-acting ends of a tie rod and knuckle arm, the essential parts of the steering gear of a current type automobile.

It is a matter of common knowledge that the eye-like constructions on the ends of a co-acting tie rod and knuckle arm are mechanically connected with one another through the medium of a so-called ball stud. The construction is such that a ball and socket joint is thus provided between said rod and arm. The upper threaded end of the stud portion of the ball stud is provided, as a general rule, with a castellated nut held in assembled position by a cotter key. Despite the fact that such a ball and socket joint operates properly, under ordinary circumstances, it is obvious that when the parts become extensively worn, the eye-like portions of the rod and arm are accidentally disconnected and steering control is lost, this to an extent that an impending accident is almost inevitable.

An object of the present invention is to structurally, functionally and otherwise improve upon ball stud retainer guards and clips, a number of different types being now in use, the desired result being attained through the medium of a simple and practical clip which is formed from a single length of wire with its end portions bent to co-act with existing or stock parts.

More particularly, novelty is predicated upon a wire clip whose intermediate portion is laterally bent to provide a ring-like portion, this marginally surrounding the castellated nut resting against the eye on the knuckle arm, the free ends of the wire being bent laterally and terminating in assembling and retaining hooks, said hooks being suitably anchored in a co-acting portion of the tie rod, whereby the clip is thus sufficiently harnessed over the stated parts in a manner to safely retain same in assembled relationship even when the ball and seat become unduly and therefore excessively worn.

Other objects and advantages of the invention will become more readily apparent from the following description and the accompanying illustrative drawings.

In the sheet of drawings, wherein like numerals are employed to designate like parts throughout the views.

Figure 1:
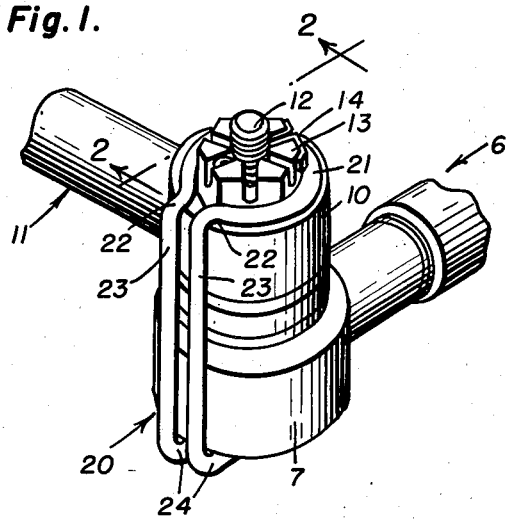
Figure 1 is a fragmentary perspective view showing a conventional tie rod, knuckle arm and ball jointed parts with the safety retainer clip in place.
Figure 2:
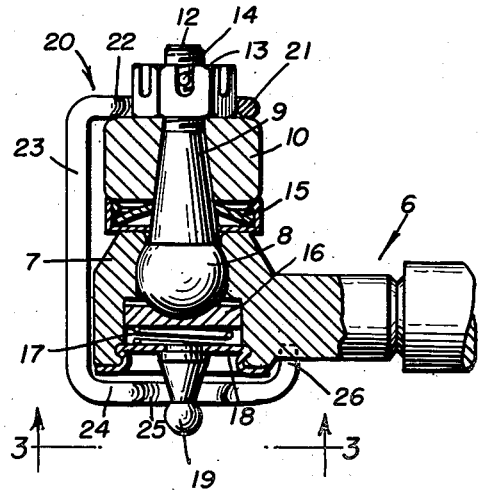
Figure 2 is a central section cut on the line 2—2 of Figure 1, looking in the direction of the arrows, the view showing parts in elevation and section.
Figure 3:
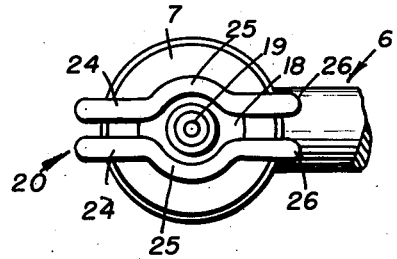
Figure 3 is a bottom plan view of Figure 2 which may be said to be taken approximately on the plane of the line 3—3 of Figure 2.

Referring now to the drawings by distinguishing reference numerals, reference is had first to Figures 1 to 3 inclusive wherein the tie rod, as a unitary construction, is denoted by the numeral 6, the same terminating in an eye 7 whose upper portion is fashioned to provide an accommodation seat for the ball 8 of the ball stud retainer. The stud portion is tapered, as is usual, at 9 and extends through a correspondingly tapered opening in the eye portion 10 of the usual knuckle arm 11. The upper screw-threaded end of the stud, as shown at 12, is provided with a commonly used castellated nut 13 held in place by a cotter key 14. Interposed between the eyes 7 and 10 is a suitable dust guard 15. Fitted in the well in the bottom portion, the counterbored portion, of the eye 7, is a spring-pressed assembling and follower member 16 pressed in place by a spring 17 which is, in turn, held in place by a snap-in cap 18. This is provided with the usual grease-gun fitting 19.

Figure 4:
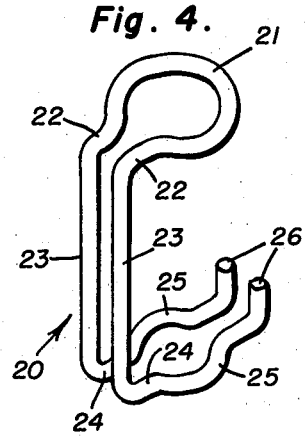
Figure 4 is a perspective view of the safety clip per se.

All of the parts so far described are old and well-known in the trade. The invention relates to the safety clip, that is the part generally denoted by the numeral 20 in Figure 4. Reference being had to Figure 4, it will be seen that said clip is formed from a single length of wire of suitable strength and gage. The wire is bent intermediate its ends into a lateral ring-like adapter 21 having end-portions 22 close together and in parallelism, said parts 22 being joined with vertical spaced parallel reach-limbs 23. These limbs are laterally bent as at 24 and are arcuately bent as at 25 and the free ends terminate in upturned anchoring hooks 27 which snap into recesses formed in the adjacent shank portion of the tie rod, as illustrated in Figure 2. The arcuate bends 25 serve to accommodate and afford access to the grease-gun fitting 19.

By fitting the adapter member 21 down and around the castellated nut, the limbs 23 are then shoved into place and the lateral terminal portions 24 and 25 underlie the existing or stock parts as shown in Figure 2. By snapping the hooks 26 into place in the sockets drilled therefor, the safety clip is now in position to attain the ends sought. That is to say, it provides a simple jointing device and maintains the eyes 7 and 10 in superposed relationship. Even after the ball 8 and seat become worn, the clip functions to maintain the tie rod and knuckle arm safely and adequately adjoined.

As previously pointed out, different forms and types of clips, clamps, and ball stud retainers have been devised and are in use. Being aware of this, I have limited my disclosure and claims to the particular invention herein covered.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. As a new article of manufacture, a safety type ball stud retainer clip, said clip being formed from a single length of heavy gage wire, the wire being bent intermediate its ends to provide a ring-like adapter at one end of said clip, intermediate spaced parallel rectilinearly spaced limb portions at right angles to said ring-like adapter and laterally bent free end-portions, said free end-portions being substantially parallel to said adapter and terminating in upstanding hooks.

2. As a new article of manufacture, a safety-type ball stud retainer clip fashioned from a single length of stout wire and having a pair of rectilinearly straight substantially rigid limb portions, said limb portions being in close spaced parallelism, having a right angularly disposed ring-like adapter at one end, said adapter being designed to rest against an eye on an eye-equipped knuckle arm and to, at the same time, surround the usual ball stud nut, said clip having, at the opposite end, reach limbs at right angles to the first-named limbs and opposed to each other and adapted to underlie an eye on a tie rod joined to said knuckle arm, said reach limbs being parallel to the adapter ring and terminating in lateral hooks, said hooks being parallel to the first-stated limbs and at right angles to said adapter ring.

3. As a new article of manufacture, a safety-type ball stud retainer clip fashioned from a single length of stout wire and having a pair of rectilinearly straight substantially rigid limb portions, said limb portions being in close spaced parallelism, having a right angularly disposed ring-like adapter at one end, said adapter being designed to rest against an eye on an eye-equipped knuckle arm and to, at the same time, surround the usual ball stud nut, said clip having, at the opposite end, reach limbs at right angles to the first-named limbs and opposed to each other and adapted to underlie an eye on a tie rod joined to said knuckle arm, said reach limbs being parallel to the adapter ring and terminating in lateral hooks, said hooks being parallel to the first-stated limbs and at right angles to said adapter ring, the intermediate portions of said reach limbs being bowed outwardly to provide accommodation bends.

HOWARD E. RIEVES.

REFERENCES CITED

The following references are of record in the file of this patent:

UNITED STATES PATENTS

| Number | Name | Date |
|---|---|---|
| 1,383,895 | Withrow | July 5, 1921 |
| 1,519,046 | Pewther | Dec. 9, 1924 |
| 2,208,325 | Krutsch | July 16, 1940 |
| 2,281,097 | Flumerfelt | Apr. 28, 1942 |